No. 677,235. Patented June 25, 1901.
G. J. KENNEDY.
WATER COOLING TOWER.
(Application filed Dec. 7, 1900.)
(No Model.) 3 Sheets—Sheet 3.
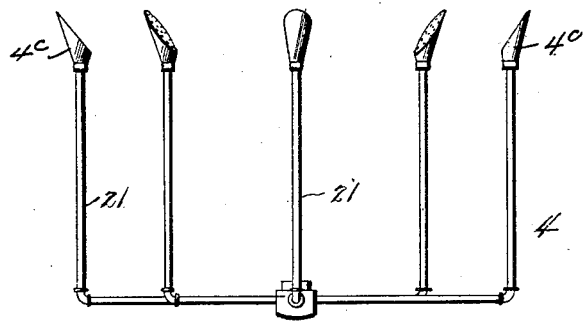
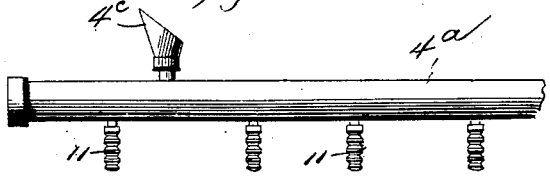
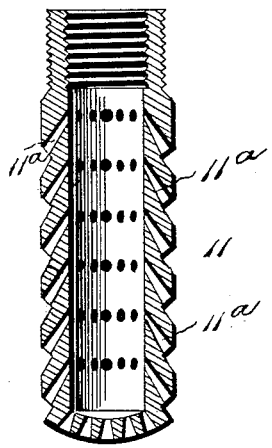
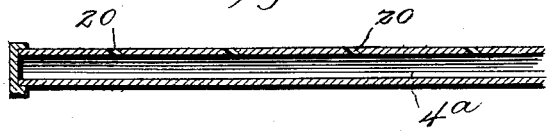
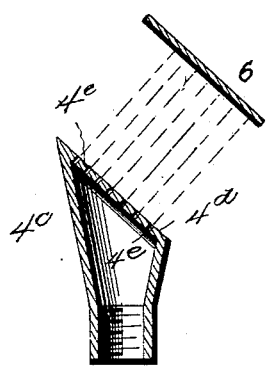
Inventor
George J. Kennedy.
By Edson Bros
Attorneys
Witnesses

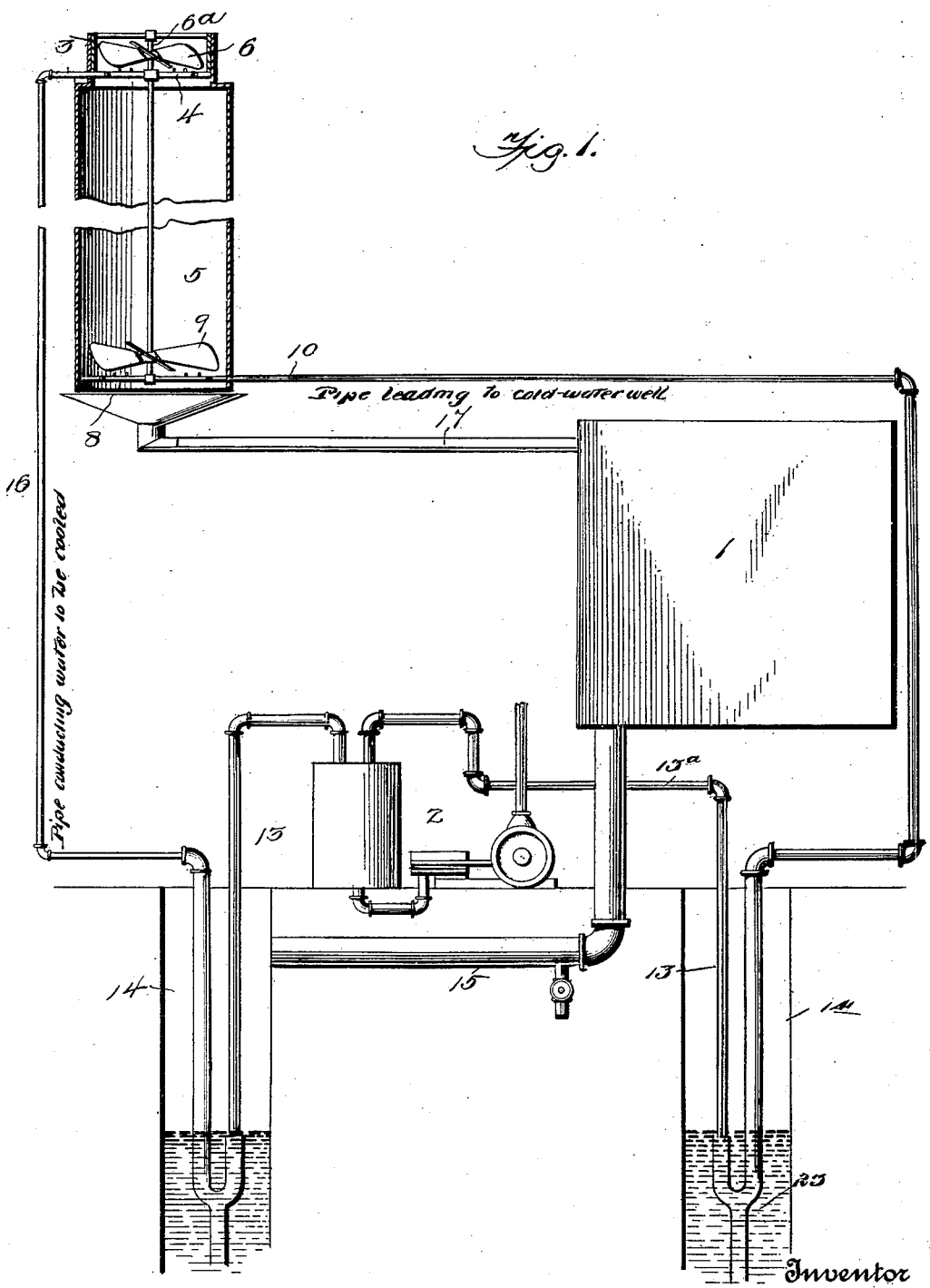

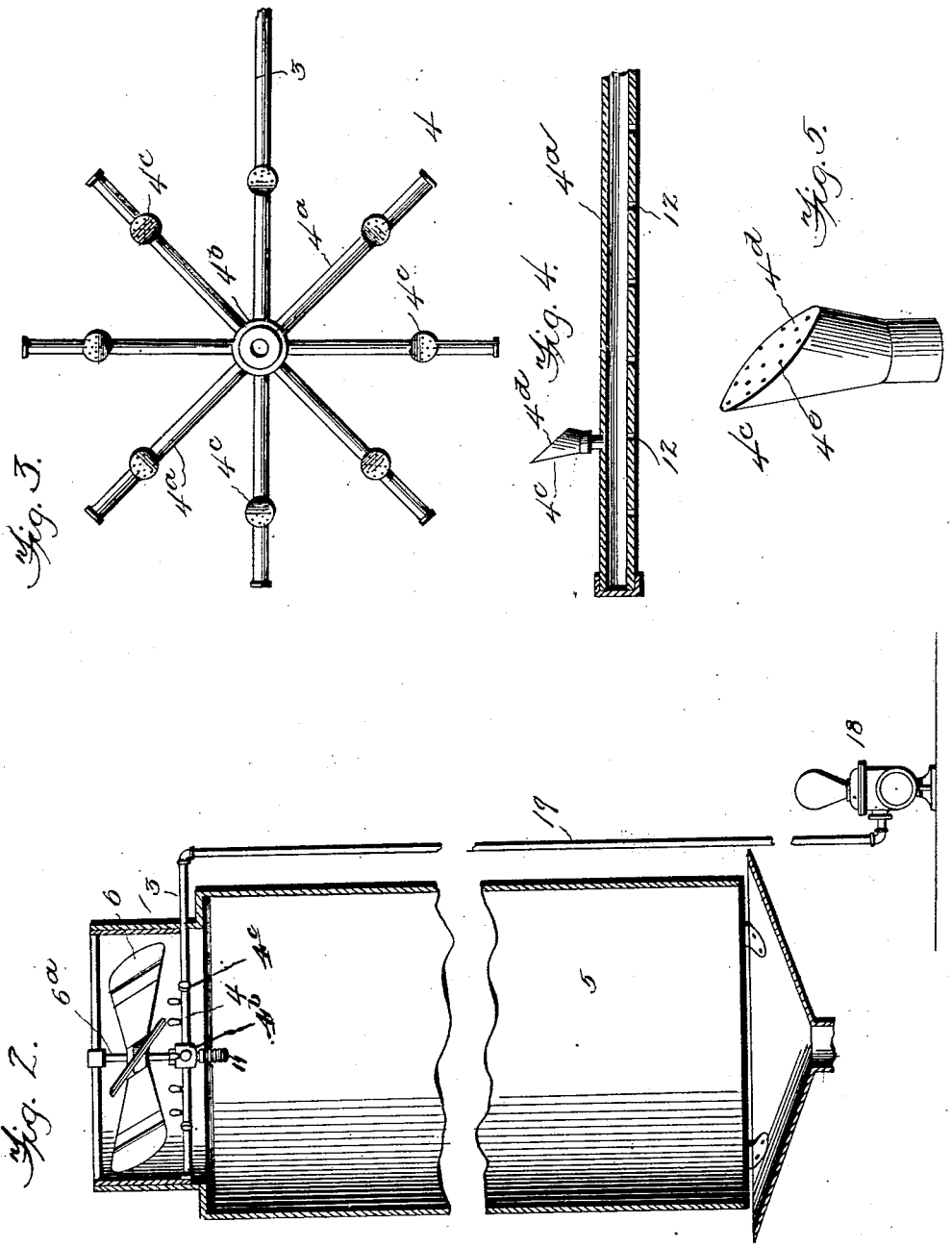

UNITED STATES PATENT OFFICE.

GEORGE J. KENNEDY, OF BALTIMORE, MARYLAND.

WATER-COOLING TOWER.

SPECIFICATION forming part of Letters Patent No. 677,235, dated June 25, 1901.

Application filed December 7, 1900. Serial No. 39,068. (No model.)

*To all whom it may concern:*

Be it known that I, GEORGE J. KENNEDY, a citizen of the United States, residing at Baltimore, in the State of Maryland, have invented certain new and useful Improvements in Water-Cooling Towers; and I do hereby declare the following to be a full, clear, and exact description of the invention, such as will enable others skilled in the art to which it appertains to make and use the same.

My invention relates to certain improvements in apparatus or systems which may be termed "water-cooling towers."

The invention is particularly designed for artificially lowering the temperature of the water after use, for instance, in an ice-condenser, which would otherwise be permitted to run to waste, and reusing said water, it being taken therefrom and forced to the desired altitude under great pressure, as presently disclosed, sprayed or divided up into small particles, and subjected to the action of cold-air currents induced by suction to aid the thorough and expeditious exhaustion or elimination of caloric from the water. The water then in order to render the removal of the heat or caloric therefrom complete is precipitated from its height or altitude to a suitable receiver below, thus still further reducing its temperature, it thus being subjected to a greater area of cooling-surface, produced, as above noted, by the generation of cold-air currents in the tower. The still further reduction of the temperature is effected by providing additional facilities for increasing the suction action, inducing additional cold-air currents within the tower, by utilizing the air-pressure of an air-compressor, as hereinafter disclosed, delivering thereby the water from a cold-water well or tank upon a second fan arranged upon the fan-shaft.

The apparatus is capable of various other uses, as in the absence of a requisite supply of cold well-water or in locations where "city water" is used. It can also be employed for spraying the water into the air, allowing it to fall on the roofs of buildings, or into the yard, or upon the sidewalk, or precipitated or directed down into a tower or from other high point.

The invention, generally stated, consists of the sundry combinations of parts, also sub-combinations thereof, including their detailed construction and arrangement, substantially as hereinafter more fully disclosed and specifically pointed out by the claims.

In the accompanying drawings, illustrating the preferred embodiment of my invention, Figure 1 is a partly section and side elevation thereof, showing its disclosure in connection with an air-compressor—the condenser of an ice-machine, for instance—and a sunken well or waste-water supply connected with said condenser and a cold-water well. Fig. 2 is an enlarged partly sectional and partly side view of the invention as used in connection with a steam-pump. Fig. 3 is a plan view showing more particularly the water-spraying device for delivering or feeding the elevated water to and driving the fan. Fig. 4 is an enlarged detailed sectional view thereof. Fig. 5 is a detached view of one of the spraying-nozzles. Fig. 6 is a modification showing more especially the spraying ducts or passages made directly in the radial pipes or arms of the water-spraying device. Fig. 7 is another modification of the water-spraying nozzle, or rather of the attachment of such nozzle to the sprayer proper. Fig. 8 is an enlarged detailed sectional view showing more especially the angularity of the passages or ducts of the spraying-nozzles and their presentation to the blades of the fan. Fig. 9 is a detailed view showing the spraying device equipped with a series of pendent nozzles with angular passages therein. Fig. 10 is an enlarged detailed sectional view of a nozzle of the form last referred to.

Latitude is allowed herein as to details, as they may be changed or varied at will without departing from the spirit of my invention and the same yet remain intact and be protected.

As one way of carrying out my invention I may connect up with the sunken reservoir or well 14, receiving the water of condensation from the condenser 1 of an ice-machine, for instance, or of other apparatus, an air-compressor 2 of any approved or other pattern, and also dipping into said well or reservoir is a pipe 3, leading to a water-spraying device 4, preferably disposed at a certain height or altitude more particularly for the purpose of subsequently precipitating the water to aid in reducing or lowering its temperature, as will be more fully seen presently. Although not essential to the practice of my invention, I arrange said water-spraying device 4 within a closure or "tower" 5, so called, as the preferable form of its disclosure, said spraying device being located at the top of said tower for the precipitation, as above intimated, of the previously-elevated water. Also at the top of said tower directly above and contiguously to the water-spraying device 4 is disposed or arranged an angular-bladed fan 6, the same being of no particular construction, with its shaft $6^a$ suitably journaled in position centrally within said tower and extending down therein. The sprayer or spraying device 4 comprises, preferably, a series of radial pipes or arms $4^a$, radiating from a central hollow "union" or chamber $4^b$, with one of said arms or pipes reaching outward and connecting with the pipe 3 to effect the immediate supply of water thereto. The arms or pipes $4^a$ are arranged, preferably, within the radius of the fan-casing and are each furnished or equipped with a spraying-nozzle $4^c$, having an inclined or obliquely-faced "head" $4^d$, the face thereof paralleling the angularity of the fan-blades. Said heads of the nozzles also have their passages or ducts $4^e$, a plurality of which is provided in each head, deflected toward the fan-blades to effect the advantageous delivery of the water therefrom upon and causing it to strike directly or squarely against the angular surfaces of the fan-blades. Thus the least possible friction of the impact of water upon the fan-blades is experienced and the water delivered upon the fan-blades near their lower peripheral edges and in the direction of their cross-section or deflection, striking the same at the point of least resistance, as seen in Figs. 1 and 8, consequently imparting the maximum momentum or speed to the fan. In this example or form of the disclosure of the invention I have shown the air-compressor 2 as indirectly delivering the water of condensation from an ice-machine condenser to the fan. The fan-shaft $6^a$ is also furnished or equipped, down near the bottom of the tower, with a duplicate arrangement of spraying device 8 and fan 9, in structure and action the same substantially in all particulars as the fan and spraying device as aforesaid. This second sprayer receives water, which is delivered upon the second fan, by means of a pipe 10, connecting with a cold-water well or cistern 23, in turn having pressure-pipe connection $13^a$ with the air-compressor 2, as described in connection with the first sprayer. It will thus be seen that by reason of the foregoing construction and arrangement of parts—i. e., said spraying device and fan—the water will be very finely divided up, bringing every particle thereof under the immediate action of cold-air currents induced by the fan, thus providing for the most effective exhaustion or elimination of the caloric or heat from the water. This initial operation of reducing or lowering the temperature of the water is supplemented by the precipitation of the same from its altitude, it thus being subjected to additional air-currents set up by the suction action of the exhaust-fan within the body of the tower, suitable lateral air inlets or openings being provided in the tower near its base, as shown, for that purpose. It will also be seen that the union or chamber $4^b$ of the spraying device has affixed to its under side a spraying-nozzle 11 with outwardly deflected or inclined passages or ducts $11^a$ and that the radial pipes or arms $4^a$ of said spraying device have openings or passages 12 through their lower sides, both said nozzles and said openings thus serving to additionally spray and divide up the water and provide for the cooling thereof by precipitation as also by the air-suction set up in the body of the tower. The water after having been cooled by the aforesaid manipulation may be lead to the condenser for reuse in its cooled condition by a pipe 17, connected centrally to the downward-tapered or conical bottom of the tower 5 and to the condenser at the top. In this form of practicing my invention it is observed that both compressed air and water are simultaneously fed or delivered to the spraying or jetting device, the compressed air from the air-exhaust commingling with the water and the compressed air by subsequent dilation or expansion, it being found, losing the latent heat or caloric it may contain, thus serving to aid the lowering of the temperature or cooling of the water.

In the example of carrying out my invention as disclosed by Fig. 2 I employ a steam-pump 18 for forcing or delivering the water into the spraying device. In all other respects this form of the apparatus is substantially the same as the foregoing, excepting that the connection between the pump and the spraying device in this example is effected directly by a single pipe, as 19, as seen.

As disclosed by Fig. 6, I may employ in lieu of the separate nozzles disclosed in the preceding embodiment of the invention simply inclined or deflected passages 20, produced directly in the sides of the pipes or arms of the spraying device, and get the same results.

In Fig. 7 I have shown still another modification of the spraying device, the nozzles in this instance each being connected by a separate or additional pipe 21 to the arms or pipes of said spraying device.

As shown in Fig. 9, the spraying device may be equipped with a series of pendent nozzles, as 22, having angular delivering-passages, Fig. 10 being an enlarged longitudinal section of one of said nozzles.

It will also be observed that a series of nozzles 22, such as shown in the last-referred-to figure, may be applied to the arms or pipes of the spraying device on their upper sides, through which water may be forced upon the fan-blades, in lieu of the form of nozzles shown in the preceding figures of the drawings.

Having thus fully described my invention, what I claim, and desire to secure by Letters Patent, is—

1. In apparatus of the character described, the combination of a suction or exhaust fan, a spraying device comprising a nozzle having a series of lateral angular passages adapted to deliver the water squarely upon the inclined fan-blades, and an air-compressor having pipe connection with said spraying device, substantially as specified.

2. In apparatus of the character described, the combination of a "tower," a suction or exhaust fan, a spraying device having nozzles, each provided with a series of angular lateral passages, a condenser, an air-compressor, a pipe connecting said spraying device with said air-compressor, and pipe connection between said "tower" and condenser, substantially as set forth.

3. In apparatus of the character described, the combination of a "tower," a suction-fan, a spraying device, an air-compressor, a depressed return-pipe connected to said spraying device and to said air-compressor, a waste or drain pipe leading from a condenser to a depressed or sunken chamber, said return-pipe dipping into said sunken chamber, and said "tower" also having pipe connection with said condenser, substantially as set forth.

4. In apparatus of the character described, the combination of duplicate spraying devices and fans, arranged at or near the upper and lower ends of their shaft, respectively, a depressed waste-water receptacle or well, a cold-water well or cistern and an air-compressor having pipe connection with said waste-water well and cold-water well and with each of said spraying devices, substantially as set forth.

In testimony whereof I affix my signature in presence of two witnesses.

GEORGE J. KENNEDY.

Witnesses:
W. PERRY HAHN,
M. JACKSON.